Sept. 5, 1944.                R. TEWKSBURY                    2,357,436
                               LATHE TURRET
                           Filed Feb. 6, 1941              2 Sheets-Sheet 1
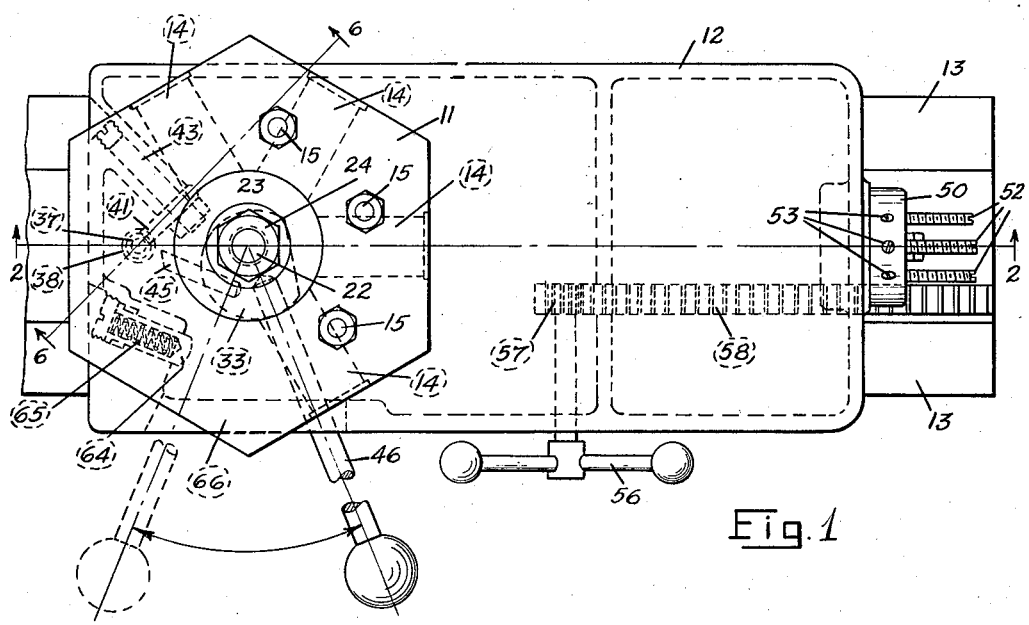
Fig. 1
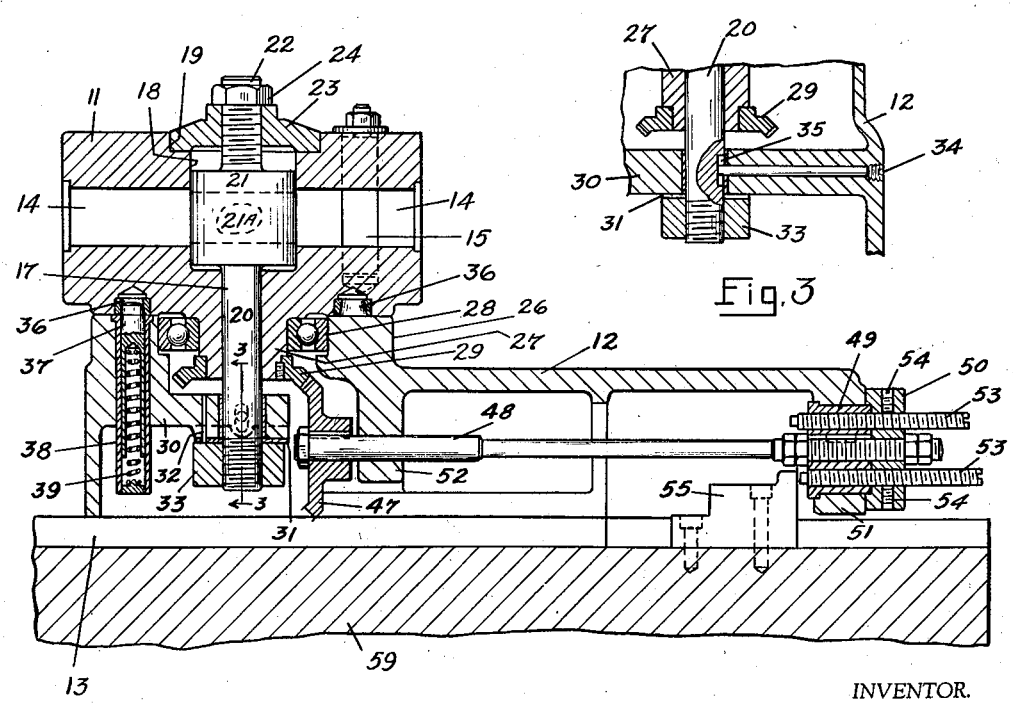
Fig. 2                          Fig. 3
INVENTOR.
Roger Tewksbury
BY Robert W. Wilson
                    ATTORNEY Sept. 5, 1944.　　　R. TEWKSBURY　　　2,357,436
LATHE TURRET
Filed Feb. 6, 1941　　　2 Sheets-Sheet 2
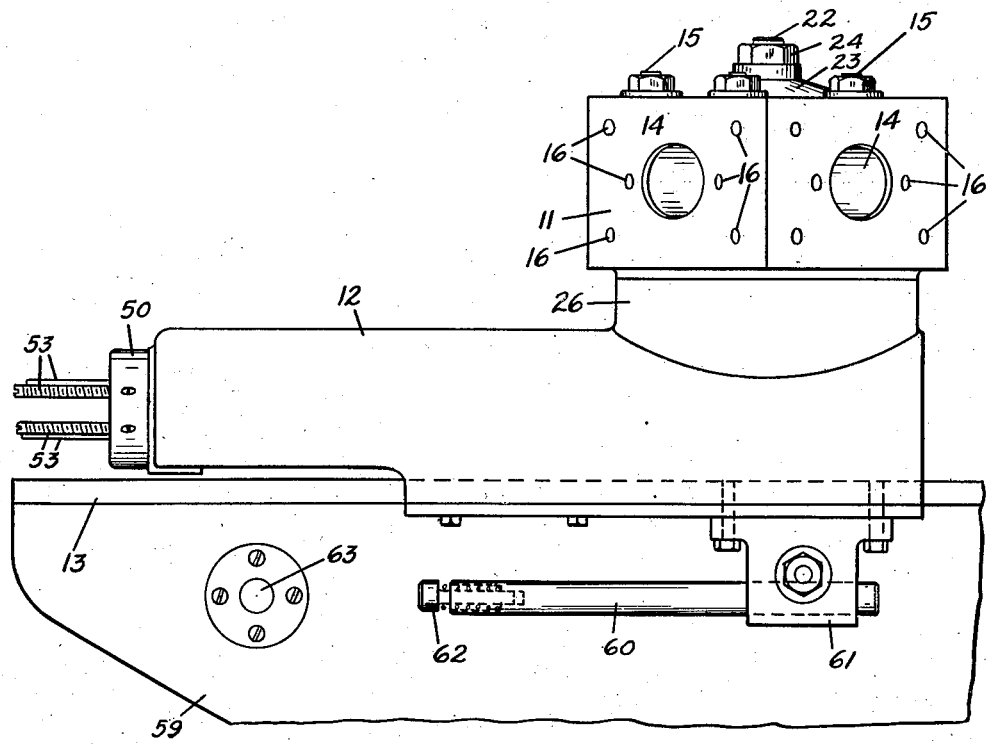
Fig. 4
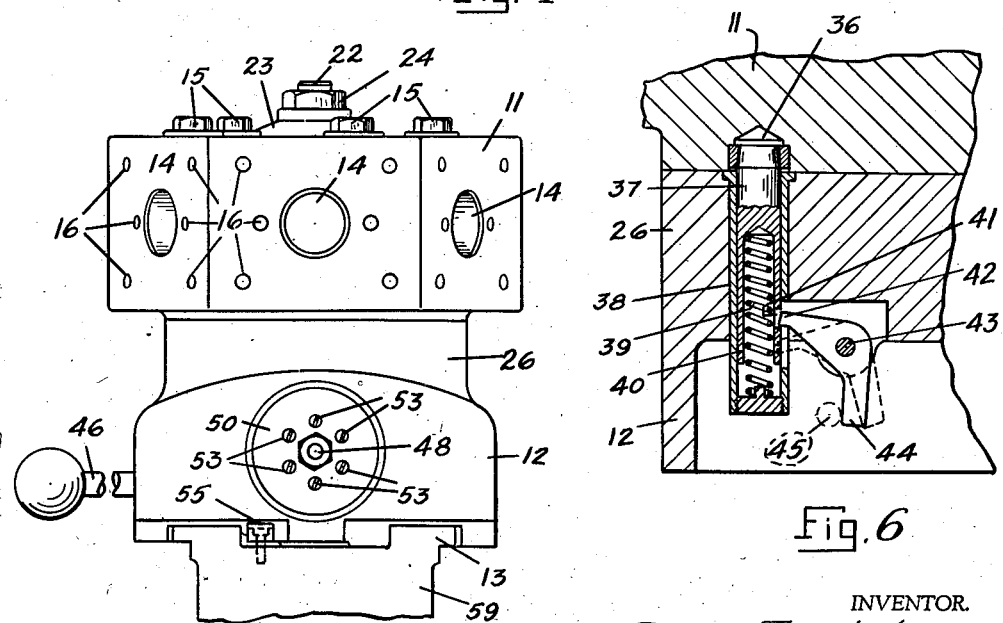
Fig. 5
Fig. 6
INVENTOR.
Roger Tewksbury
BY Robert W. Wilson
ATTORNEY.

Patented Sept. 5, 1944

2,357,436

UNITED STATES PATENT OFFICE 2,357,436

LATHE TURRET

Roger Tewksbury, Euclid, Ohio, assignor to The Oster Manufacturing Company, Cleveland, Ohio, a corporation of Ohio Application February 6, 1941, Serial No. 377,727

4 Claims. (Cl. 29—49)

This invention comprises an improved lathe turret, and has for its purposes the provision of such a turret of few parts, simple and rugged construction, readily assembled and disassembled, easily kept in adjustment and repair, relatively cheap to manufacture, simple to operate, adaptable by variations in operation to work of greater or less accuracy. Further advantages include improved locking mechanism, added top clearance which is obtained by placing the locking mechanism at the bottom instead of at the top of the turret, completely housing all indexing and locking parts in or under the turret, and arranging carriage stops to give minimum likelihood of getting out of adjustment in use.

Other advantages of the invention will be apparent to those skilled in the art from the following description and accompanying drawings which pertain to a preferred specific embodiment of the principles of the invention.

In the accompanying drawings:

Fig. 1 is a plan view of the improved turret and its carriage;

Fig. 2 is a vertical central section taken longitudinally of the turret slide and carriage, plane 2—2 of Fig. 1;

Fig. 3 is a transverse vertical section of a detail on the plane 3—3 of Fig. 2, looking in the direction of the arrows;

Fig. 4 is a back elevation of the carriage and turret on the lathe bed;

Fig. 5 is an end elevation of the carriage and turret, looking from right to left of Fig. 2; and Fig. 6 is a detailed section on plane 6—6 of Fig. 1, showing the indexing latch in greater detail.

As best seen in Fig. 1, the turret 11, which is preferably an integral block, is mounted on one end of a carriage 12, which travels longitudinally on the usual lathe ways 13. The prefered form of turret, herein shown is hexagonal with tool holding arrangements, such as the chucking sockets 14 in each of the six faces of the turret. Two of these sockets are omitted from Fig. 1 so as not to complicate the drawings. The chucks or other tool holders are held by conventional means, such as the clamping studs 15, or screws in threaded holes 16, or the like. Three of the six studs 15 are omitted from Fig. 1 to simplify the figure.

The turret 11 is centrally bored on three different diameters through its vertical axis, as at 17, 18 and 19, to receive a spindle having a lower stud 20, threaded at bottom, a boss 21 above the lower stud, and a threaded top stud 22. The bore 18 intersects the chucking sockets 14, so that such sockets are open at the bottom. It will be observed in Fig. 2 that the boss 21 is shorter than its corresponding bore 18, clears the shoulder between the small bore 17 and the large bore 18, and has a through horizontal hole 21A of about the same diameter as the chucking sockets 14, and aligned in the direction of carriage travel, so that long work can project into 21A, and, if the socket opposite the working socket is left vacant, can project entirely through the turret. A large flanged nut 23 bears on the shoulder between 18 and 19. There is a lock nut 24 above 23. The turret rests upon a hollow pedestal 26 which is conveniently made as an integral part of the carriage 12. A neck 27 on the turret projects downward into this pedestal, is centered therein by a radial ball bearing 28, and carries keyed to its bottom a miter gear 29.

The stud 20 of the pivot bears radially below neck 27 in a bracket 30 which is part of the carriage 12, and a washer 31 is pinned as at 32 to the under side of the bracket to take the upward thrust of a nut 33 which is threaded on the lower end of stud 20. The end of a pin 34 in the bracket projects into a slot 35 in stud 20 to prevent the entire central pivot from turning but at the same time to allow pivot to be adjusted up and down by the top flanged nut 23.

There are six taper bushed holes 36 in the bottom face of the main body of the turret, corresponding to the six indexing positions of the turret. The appropriate one of these is entered by the tapered upper end of a latch pin 37 mounted in the pedestal 26. The preferred mounting is in a suspended guided sleeve 38, wherein a spring 39 urges the pin upward. The pin 37 includes a skirt 40, longitudinally slotted at 41 for entrance of the nose 42 of a bell crank lever pivoted at 43 and whose dependent arm 44 is engageable by a horizontal operating finger 45 as described below. Counterclockwise movement of the bell crank lever releases the latch pin 37.

The nut 33 is of somewhat irregular outline, as shown in Fig. 1, the irregularity being to allow necessary clearances in its movement. The finger 45 and a handle 46 are both horizontally set rigidly in the nut 33, the former tangentially and the latter radially.

Miter gear 29 meshes with a miter gear 47 fast upon a horizontal shaft 48 running lengthwise within the carriage 12. A considerable length of the shaft is reduced to give clearance for taking down the mechanism. A cylinder 49 is keyed to the rear end of the shaft and a cap 50 is threaded onto the shaft behind the cylinder. These two elements, which are held in place by suitable nuts, together constitute a radial and thrust journal in a rear dependent web 51 of the carriage 12, while the front end of the shaft 48 bears radially in another web 52.

Six paraxial threaded holes through the thrust journal carrying adjustable indexing stop screws 53, each with its set screw 54, for stopping the forward travel of the carriage by means of stop block 55, attached to the frame.

The carriage is racked up to the work in the usual manner by hand wheel 56 and pinion 57 on the carriage, and rack 58 on the frame 59. A stop rod 60 is adjustable for length in a back bracket 61 on the carriage. A buffer head 62 in the rear end of this rod strikes a stop 63 on the frame.

The operation is as follows:

Swinging the handle 46 clockwise in Fig. 1 first loosens the nut 33, then brings finger 45 against arm 44 of the bell crank lever, moving same to the dotted position of Fig. 6 and so withdrawing latch pin 37 from the hole 36. The angle cut of the end of the finger allows it to clear the sleeve 38. The turret is then indexed by hand to the new position, such indexing automatically bringing the proper stop screw 53 into position to strike the abutment 55 on the forward travel of the carriage. Optionally the mechanism may include a kick-back plunger 64, the spring 65 of which is compressed by the last part of the clockwise movement of the handle, which plunger moves the handle counterclockwise when the operator lets go.

Unless the work in progress is very accurate, the handle 46 can be allowed to stop short of the full line position of Fig. 1, not tightening the lower nut 33. To tighten the nut, the handle is swung further to the right. To regulate the amount of tightening which the handle causes, and keep the handle swing effective within the limits of the opening 66 in the carriage side, the central spindle can be moved up or down within the turret by turning the flanged nut 23. The pin 34 prevents the spindle rotating.

The carriage is racked back and forth by the usual mechanism, shown in Fig. 1. The length of the back movement is governed by the stop elements 60 to 63 inclusive, Fig. 4. Rod 60 can be set to protrude any length from the clamp 61, or back bracket. The shock of stopping is cushioned by the buffer head 62.

It will be understood that the invention may be embodied in various modified forms, its scope being defined by the following claims.

I claim:

1. A turret lathe comprising in combination an annular pedestal, a turret riding on the top surface of the rim thereof, a neck on said turret depending into said pedestal and bearing laterally inwardly therein, a bracket within said pedestal below said neck, a spindle disposed vertically through said turret and said bracket, means allowing endwise movement of said spindle in said bracket while inhibiting turning of the same, a horizontal bevel gear carried by the lower portion of said neck above said bracket, an element carried by said spindle and adapted to bear down upon said turret, a nut upon said spindle below said bracket, said nut being adapted to bear upward against said bracket, a vertical bevel gear within said pedestal to one side of said bracket and said nut and meshing with said horizontal gear, a horizontal stop-indexing shaft bearing in said pedestal and carrying said vertical gear, a horizontal handle secured to said nut and projecting through a side of said pedestal, an indexing lock bolt in said pedestal engageable with said turret, a finger carried by said nut and means whereby said finger actuates said bolt upon swing of said lever in a direction to loosen said nut, and a spring in the path of said lever adapted to be compressed by the lever movement in nut-loosening direction and to return the lever to nut-tightening position.

2. A turret lathe comprising in combination an annular pedestal, a turret riding on the top surface of the rim thereof, a neck on said turret depending into said pedestal and bearing laterally inwardly therein, a bracket within said pedestal below said neck, a spindle disposed vertically through said turret and said bracket, means allowing endwise movement of said spindle in the bracket while inhibiting turning of the same, a horizontal bevel gear carried by the lower portion of said neck above said bracket, an element carried by said spindle and adapted to bear down upon said turret, means for locking said element in different positions of vertical adjustment on the spindle, a nut upon said spindle below said bracket, said nut being adapted to bear upward against said bracket, a vertical bevel gear within said pedestal to one side of said bracket and said nut and meshing with said horizontal gear, a horizontal stop-indexing shaft bearing in said pedestal and carrying said vertical gear, and a horizontal handle secured to said nut and projecting through a side of said pedestal.

3. In a turret lathe, an annular pedestal, a turret rotatable in the pedestal, said turret riding in the rim of the pedestal and having a depending neck portion centered in the pedestal, a bracket fixed to the pedestal and positioned beneath said neck portion, a turret clamping spindle coaxial with the pedestal and extending vertically through said neck and bracket, means for guiding said spindle for vertical movement in said bracket and for holding the same against turning movements in the bracket, a clamping nut on said spindle beneath the bracket and adapted to bear against the under face of the bracket, a laterally extending handle attached to said nut, and means for adjusting said spindle vertically to vary the throw of said handle for clamping and freeing the turret comprising a positioning nut on said spindle having its underside engageable with said turret and means for locking said positioning nut in adjusted positions on the spindle.

4. In a turret lathe, an annular pedestal, a turret rotatable in the pedestal, said turret riding in the rim of the pedestal and having a depending neck portion centered in the pedestal, a bracket fixed to the pedestal and positioned beneath said neck portion, a turret clamping spindle coaxial with the pedestal and extending vertically through said neck and bracket, means for guiding said spindle for vertical movement in said bracket and for holding the same against turning movements in the bracket, means for adjusting the spindle vertically and for locking the same in adjusted positions, a clamping nut on said spindle beneath the bracket and adapted to bear against the under face of the bracket, a laterally extending handle attached to said nut, an indexing lock bolt in the pedestal engageable with the turret to hold the same in adjusted positions, a finger attached to said clamping nut, and means actuated by said finger for withdrawing said lock bolt when said clamping nut is turned in a direction to free the turret.

ROGER TEWKSBURY.